United States Patent [19]

Hosoi

[11] Patent Number: 5,724,179
[45] Date of Patent: Mar. 3, 1998

[54] ACOUSTO-OPTIC FILTER

[75] Inventor: Toru Hosoi, Tokyo, Japan

[73] Assignee: NEC Corporation, Tokyo, Japan

[21] Appl. No.: 753,397

[22] Filed: Nov. 26, 1996

[30] Foreign Application Priority Data

Nov. 29, 1995 [JP] Japan ................... 7-310240

[51] Int. Cl.$^6$ ................... G00F 1/33
[52] U.S. Cl. ................... 359/308; 359/308
[58] Field of Search ................... 359/308, 309, 359/246

[56] References Cited

U.S. PATENT DOCUMENTS

| 5,329,397 | 7/1994 | Chang | 356/308 |
| 5,400,171 | 3/1995 | Song | 359/308 |
| 5,452,314 | 9/1995 | Aronson | 359/308 |
| 5,455,877 | 10/1995 | Baran et al. | 359/308 |

FOREIGN PATENT DOCUMENTS 4-159516  6/1992  Japan ................... 359/308

OTHER PUBLICATIONS

"Two Stage Integrated–Optic Acoustically Tunable Optical Filter with Enhanced Sidelobe Suppression", Electronics Letters vol. 25, No. 6, pp. 398–399, Mar. 1989.

*Primary Examiner*—Frank G. Font
*Assistant Examiner*—Zandra V. Smith
*Attorney, Agent, or Firm*—Scully, Scott, Murphy & Presser

[57] ABSTRACT

In an acousto-optic filter, a channel type optical waveguide is fabricated on a substrate. First and second surface acoustic wave transducers are mounted on the optical waveguide, respectively, in correspondence with input and output terminals thereof to transduce first and second surface acoustic waves. First and second polarization converters respectively convert only a specific wavelength component of first linearly polarized light excited at the input terminal of the optical waveguide through interaction of the first surface acoustic wave into second linearly polarized light perpendicular to the first linearly polarized light, and only a specific wavelength component of second linearly polarized light obtained by conversion of the first polarization converter through interaction of the second surface acoustic wave generated by the second surface acoustic wave transducer into first linearly polarized light. The first polarization converter has a first interacting region where the first surface acoustic wave and the first linearly polarized light interact. The second polarization converter has a second interacting region, having a length different from the first interacting region, where the second surface acoustic wave and the second linearly polarized light interact.

6 Claims, 3 Drawing Sheets

ACOUSTO-OPTIC FILTER

BACKGROUND OF THE INVENTION

The present invention relates to an optical wavelength filter and, more particularly, to an optical wavelength filter using an acousto-optic effect obtained by collinear coupling.

An optical wavelength filter using an acousto-optic effect has advantages such as a high-speed operation a wide tunable range so as to assure a large number of channels, and simultaneous selection of a plurality of wavelengths.

An conventional example of a filter of this type is as follows.

FIG. 4 shows an acousto-optic filter 50 cited from "TWO-STAGE INTEGRATED-OPTIC ACOUSTICALLY TUNABLE OPTICAL FILTER WITH ENHANCED SIDELOBE SUPPRESSION", ELECTRONICS LETTERS Vol. 25 No. 6, pp. 398–399, March 1989. Referring to FIG. 4, in the acousto-optic filter 50, surface acoustic waves excited by surface acoustic wave transducers 52a and 52b mounted on a lithium niobate substrate 51 cause periodical refractive index changes in first and second interacting regions 54a and 54b fabricated on the surface of the lithium niobate substrate 51 and including a titanium-diffused optical waveguide 53. Accordingly, linearly polarized light having an electric field component parallel to the substrate 51 (to be referred to as TE-polarized light hereinafter) and a specific optical wavelength is converted into linearly polarized light having an electric field component perpendicular to the substrate (to be referred to as TM-polarized light hereinafter). Of the TE-polarized light excited at the input terminal of the optical waveguide 53, this TE-polarized light having the specific optical wavelength satisfies phase matching conditions through the periodic refractive index change of the first interacting region 54a.

A TM polarizer 55 comprising a z-cut lithium niobate wafer piece is located near the center of the element. The TM-polarized light and TE-polarized light are respectively transmitted through and radiated by the TM polarizer 55, thereby selecting the specific wavelength. The TM-polarized light having the specific wavelength is converted again into TE-polarized light by the second interacting region 54b. In this manner, polarization conversion having a wavelength dependency is performed in the two-stage manner to decrease the sidelobe level of the filter characteristics. In FIG. 4, reference numerals 56a to 56d denote acoustic absorbers.

The above acousto-optic filter according to the prior art utilizes the interaction of the surface acoustic wave and optical wave. In this acousto-optic filter of the prior art, the coupling coefficient of the sound wave and optical wave is constant, and the sidelobe level of the filter characteristics is theoretically about −9 dB. Further sidelobe suppression than this cannot be expected. In order to further lower the sidelobe level, in the optical wavelength filter shown in FIG. 4, two TE/TM polarization light converters are connected in tandem. However, this optical wavelength filter merely provides a characteristic level of −18 dB which is the sum of the characteristics of two single converters.

SUMMARY OF THE INVENTION

It is, therefore, an object of the present invention to provide an acousto-optic filter capable of lowering the sidelobe level.

It is another object of the present invention to provide an acousto-optic filter that can be used as an optical waveguide filter having a high S/N ratio in the optical wavelength multiplex communications system requiring an element having an optical wavelength selecting function.

In order to achieve the above objects, according to the present invention, there is provided an acousto-optic filter comprising a channel type optical waveguide fabricated on a substrate, first surface acoustic wave transducing means mounted on the optical waveguide in correspondence with an input terminal thereof to transduce a first surface acoustic wave, first polarization converting means for converting only a specific wavelength component of first linearly polarized light excited at the input terminal of the optical waveguide through interaction of the first surface acoustic wave generated by the first surface acoustic wave transducing means into second linearly polarized light perpendicular to the first linearly polarized light, the first polarization converting means having a first interacting region where the first surface acoustic wave and the first linearly polarized light interact, second surface acoustic wave transducing means mounted on the optical waveguide in correspondence with an output terminal of the first polarization converting means to excite a second surface acoustic wave, and second polarization converting means for converting only a specific wavelength component of second linearly polarized light obtained by conversion of the first polarization converting means through interaction of the second surface acoustic wave generated by the second surface acoustic wave transducing means into first linearly polarized light, the second polarization converting means having a second interacting region where the second surface acoustic wave and the second linearly polarized light interact, the second interacting region having an interacting length different from that of the first interacting region.

DESCRIPTION OF THE PREFERRED EMBODIMENT

The preferred embodiment of the present invention will be described with reference to the accompanying drawings.

Figure 1:
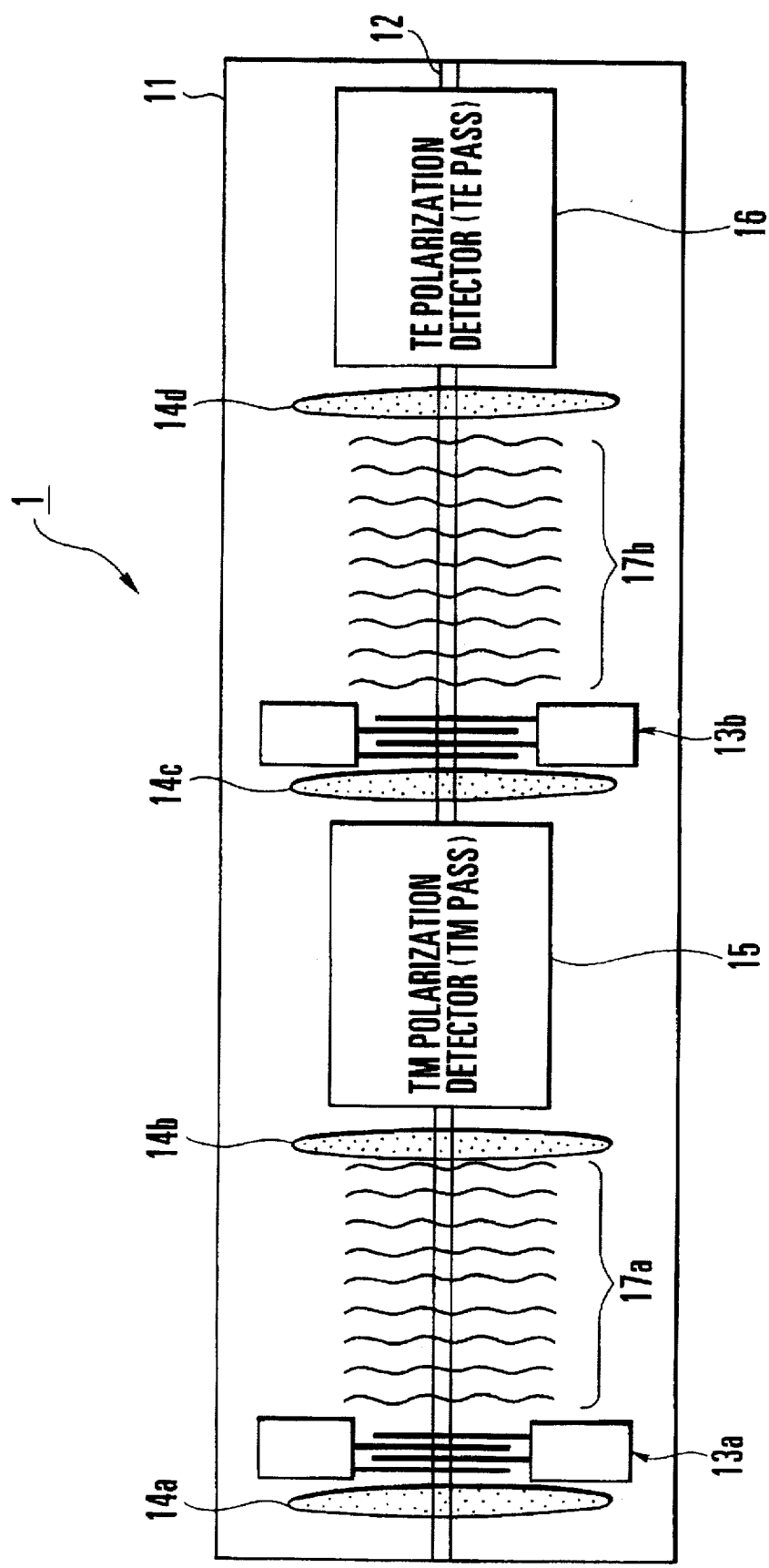
FIG. 1 is a schematic view showing the arrangement of an acousto-optic filter according to an embodiment of the present invention.

FIG. 1 shows an acousto-optic filter according to an embodiment of the present invention. In this embodiment, an optical waveguide is fabricated in accordance with titanium diffusion by using a lithium niobate substrate. An explanation will be made by way of an example using two polarization converters.

Referring to FIG. 1, an acousto-optic filter 1 is constituted by a substrate 11 made of lithium niobate ($LiNbO_3$), an optical waveguide 12, surface acoustic wave transducers 13a and 13b having a pair of interdigital electrodes, surface acoustic wave absorbers 14a, 14b, 14c, and 14d, a TM polarization detector 15, a TE polarization detector 16, and first and second interacting regions 17a and 17b. The optical waveguide 12 is linearly fabricated at the center of the surface layer of the substrate 11. The surface acoustic wave transducers 13a and 13b are mounted on the surface of the substrate 11 to transduce surface acoustic waves. The surface acoustic wave absorbers 14a, 14b, 14c, and 14d absorb the surface acoustic waves to prevent leakage from the first and second interacting regions 17a and 17b. The TM polarization detector 15 is provided at the central portion of the optical waveguide 12 to detect and transmit only TM-polarized light. The TE polarization detector 16 is arranged near the output terminal of the optical waveguide 12 to detect and transmit only TE-polarized light. The surface acoustic wave generated by the surface acoustic wave transducer 13a and the TE-polarized light interact at the first interacting region 17a. The surface acoustic wave generated by the surface acoustic wave transducer 13b and the TM-polarized light interact at the second interacting region 17b. The first and second interacting regions 17a and 17b respectively constitute polarization converters.

The surface acoustic wave absorber 14a, the surface acoustic wave transducer 13a, the first interacting region 17a, the surface acoustic wave absorber 14b, the TM polarization detector 15, the surface acoustic wave absorber 14c, the surface acoustic wave transducer 13b, the second interacting region 17b, the surface acoustic wave absorber 14d, and the TE polarization detector 16 are sequentially arranged on the acousto-optic filter 1 along the optical waveguide 12 from the input terminal to the output terminal. The first interacting region 17a starts at the position of the surface acoustic wave transducer 13a and terminates at the position of the surface acoustic wave absorber 14b. The second interacting region 17b starts at the position of the surface acoustic wave transducer 13b and terminates at the position of the surface acoustic wave absorber 14d.

The operation of the acousto-optic filter having the above arrangement will be described. Of the TE-polarized light transduced at the input terminal of the optical waveguide 12, only a specific wavelength component is converted into TM-polarized light by the polarization converter constituted by the first interacting region 17a due to the interaction with the surface acoustic wave generated by the surface acoustic wave transducer 13a. The TM-polarized light obtained through conversion by the first interacting region 17a is input to the TM polarization detector 15. The TM polarization detector 15 detects and transmits only the TM-polarized light. Of the TM-polarized light which has been transmitted through the TM polarization detector 15, only a specific wavelength component is converted into TE-polarized light by the polarization converter constituted by the second interacting region 17b due to the interaction with the surface acoustic wave generated by the surface acoustic wave transducer 13b. The TE-polarized light obtained through conversion by the second interacting region 17b is input to the TE polarization detector 16. The TE polarization detector 16 detects and transmits only the TE-polarized light and outputs it at the output terminal of the optical waveguide 12.

At this time, the surface acoustic wave absorbers 14a and 14b prevent leakage of the surface acoustic wave from the first interacting region 17a, and the surface acoustic wave absorbers 14c and 14d prevent leakage of the surface acoustic wave from the second interacting region 17b.

This acousto-optic filter 1 is manufactured in the following manner.

A titanium stripe having a width of 6 µm to 10 µm and a thickness of 600 Å to 1,500 Å is formed on the x-cut y-propagating lithium niobate substrate 11. Thermal diffusion at 950° C. to 1,100° C. is performed to fabricate the single-mode titanium-diffused optical waveguide 12.

As each of the surface acoustic wave transducers 13a and 13b, a pair of interdigital electrode elements are used. These electrode elements are fabricated to have an electrode element pitch satisfying the conversion conditions between the TE-polarized light and TM-polarized light at the central optical waveguide between 10 µm and 50 µm. For example, when the optical wavelength is 1.55 µm, the electrode element pitch takes a value near 21 µm.

Assuming that the interacting length of the first interacting region 17a is defined as $L_1$ and that of the second interacting region 17b is defined as $L_2$, two polarization converters are fabricated under a condition that substantially $L_1=1.5\times L_2$ or $L_2=1.5\times L_1$. When the above condition is set for the interacting lengths $L_1$ and $L_2$, in the light-transmitting characteristic waveforms of the two polarization converters, the valley position of the sidelobe of one converter overlaps the peak position of the sidelobe of the other converter and the peak position of the sidelobe of one converter overlaps the valley position of the sidelobe of the other converter. Thus, a further decrease in sidelobe level can be achieved when compared to the light-transmitting characteristics of the prior art in which the peak positions of the two converters overlap with each other.

More specifically, in the acousto-optic filter of this embodiment, the peak and valley positions of the sidelobe of the light-transmitting characteristics of one polarization converter overlap the valley and peak positions, respectively, of the sidelobe of the light-transmitting characteristics of the other polarization converter, so that the resultant sidelobe level can be lower than the sidelobe level of the light-transmitting characteristics of a single polarization converter.

Figure 2:
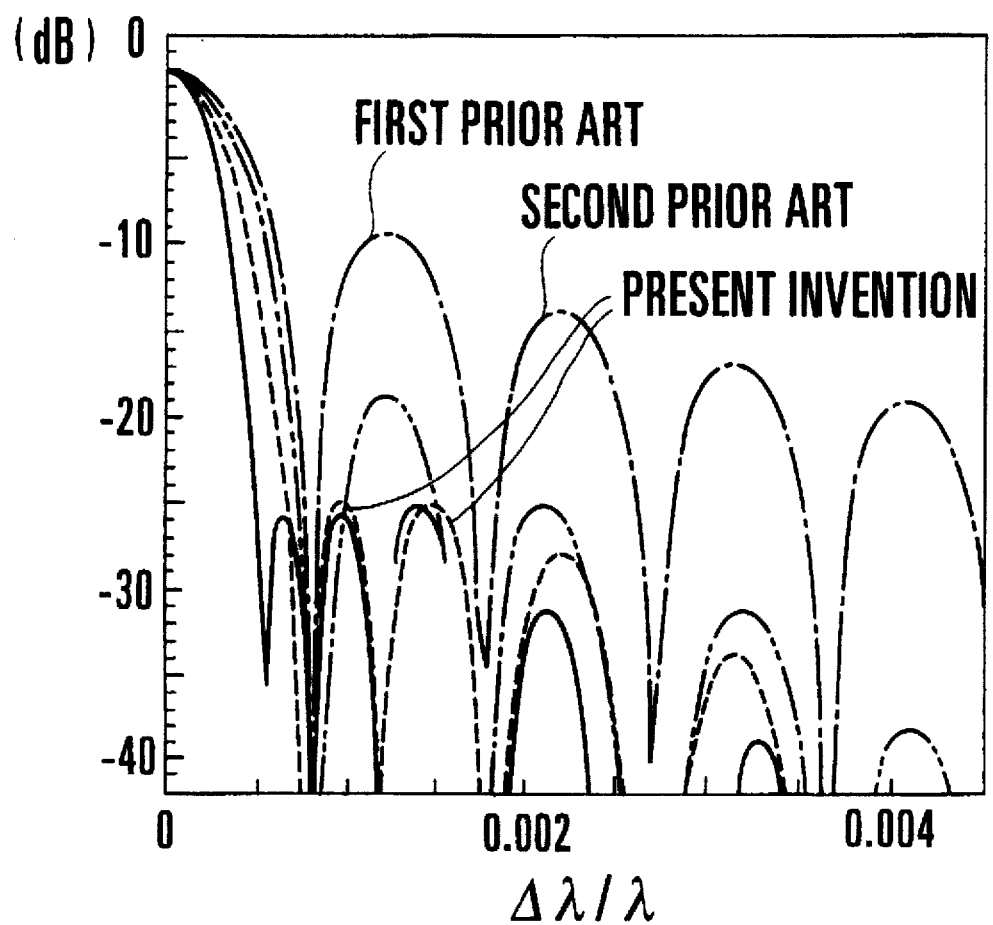
FIG. 2 is a graph for explaining the effect of the acousto-optic filter shown in FIG. 1.

FIG. 2 shows changes in transmitted light output with respect to shifts from the center wavelength in order to explain the acousto-optic filter shown in FIG. 1. As shown in FIG. 2, in the acousto-optic filter of the present invention which has two stages of polarization converters with two interacting lengths that are set such that one is substantially 1.5 times the other, a low sidelobe level of about −25 dB can be realized. In contrast to this, in the first conventional acousto-optic filter having one polarization converter, the sidelobe level is limited to about −9 dB, and in the second conventional acousto-optic filter having two polarized converters with two equal interacting lengths, the sidelobe level is limited to about −18 dB.

Figure 3:
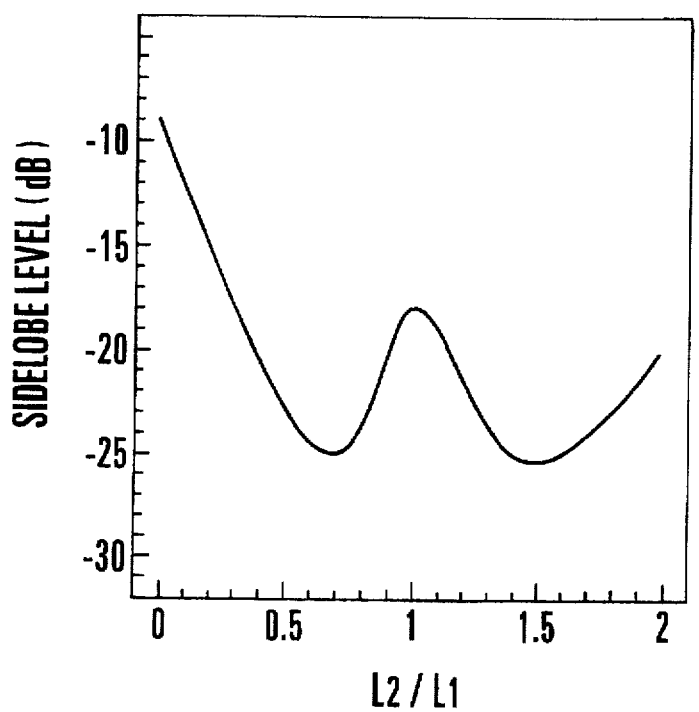
FIG. 3 is a graph for explaining the effect of the acousto-optic filter shown in FIG. 1.
Figure 4:
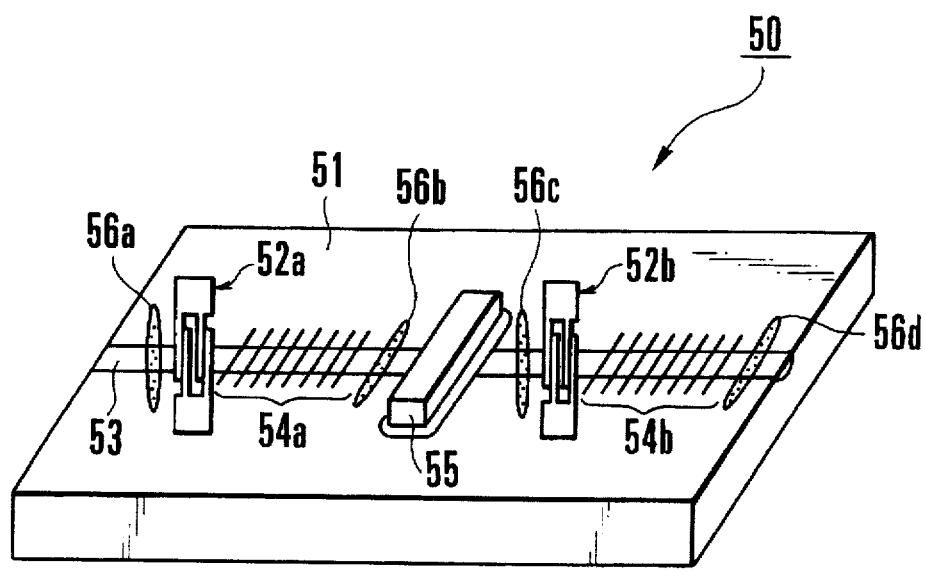
FIG. 4 is a schematic view showing the arrangement of a conventional acousto-optic filter.

FIG. 3 shows changes in sidelobe level with respect to the ratio $L_2/L_1$ of the interacting lengths of the two polarization converters in order to explain the effect of the acousto-optic filter according to the embodiment of the present invention. When $L_2/L_1$=near 2/3 and near 3/2, the sidelobe level becomes about −25 dB, thereby obtaining the maximum sidelobe suppression effect.

As has been described above, in the present invention, a plurality of interaction sections having different interacting lengths and respectively constituting polarization converters are arranged. When the ratio of the interacting lengths is set to near 1.5, the valley position of the sidelobe of the light-transmitting characteristics of one polarization converter overlaps the peak position of the sidelobe of the light-transmitting characteristics of other polarization converter and the peak position of the sidelobe of the light-transmitting characteristics of one polarization converter overlaps the valley position of the sidelobe of the light-transmitting characteristics of the other polarization converter, thereby decreasing the sidelobe level to about −25 dB. Thus, an optical wavelength filter having a high S/N ratio can be obtained, which is a very large effect in the optical wavelength multiplex communications system requiring an element having an optical wavelength selecting function.

What is claimed is:

1. An acousto-optic filter comprising:

a channel type optical waveguide fabricated on a substrate;

first surface acoustic wave transducing means mounted on said optical waveguide in correspondence with an input terminal thereof to transduce a first surface acoustic wave;

first polarization converting means for converting only a specific wavelength component of first linearly polarized light excited at said input terminal of said optical waveguide through interaction of the first surface acoustic wave generated by said first surface acoustic wave transducing means into second linearly polarized light perpendicular to the first linearly polarized light, said first polarization converting means having a first interacting region where the first surface acoustic wave and the first linearly polarized light interact;

second surface acoustic wave transducing means mounted on said optical waveguide in correspondence with an output terminal of said first polarization converting means to excite a second surface acoustic wave; and second polarization converting means for converting only a specific wavelength component of second linearly polarized light obtained by conversion of said first polarization converting means through interaction of the second surface acoustic wave generated by said second surface acoustic wave transducing means into first linearly polarized light, said second polarization converting means having a second interacting region where the second surface acoustic wave and the second linearly polarized light interact, said second interacting region having an interacting length different from that of said first interacting region.

2. A filter according to claim 1, wherein one of said first and second interacting regions has an interacting length of substantially 1.5 times that of the remaining one of said first and second interacting regions.

3. A filter according to claim 2, further comprising:

first linear polarization detecting means for detecting and transmitting only the second linearly polarized light output from said first polarization converting means; and second linear polarization detecting means for detecting and transmitting only the first linearly polarized light output from said second polarization converting means.

4. A filter according to claim 3, wherein said first linear polarization detecting means is provided at a central portion of said optical waveguide, said second linear polarization detecting means is provided near said output terminal of said optical waveguide, and said first polarization converting means, said first linear polarization detecting means, said second polarization converting means, and said second linear polarization detecting means are arranged in tandem along said optical waveguide.

5. A filter according to claim 4, further comprising:

first surface acoustic wave absorbing means arranged at an input terminal of said first linear polarization detecting means; and second surface acoustic wave absorbing means arranged at an input terminal of said second linear polarization detecting means, and wherein said first interacting region corresponds to a range extending from a position of said first surface acoustic wave transducing means to a position of said first surface acoustic wave absorbing means, and said second interacting region corresponds to a range extending from a position of said second surface acoustic wave transducing means to a position of said second surface acoustic wave absorbing means.

6. A filter according to claim 3, wherein the first linearly polarized light and the second linearly polarized light are TE-polarized light and TM-polarized light, respectively, and said first and second linear polarization detecting means comprise a TE polarization detector and a TM polarization detector, respectively.

* * * * *